(12) United States Patent
Kim et al.

(10) Patent No.: US 9,625,609 B2
(45) Date of Patent: Apr. 18, 2017

(54) SYSTEM AND METHOD FOR DETERMINING A BOREHOLE AZIMUTH USING GRAVITY IN-FIELD REFERENCING

(71) Applicant: Mostar Directional Technologies Inc., Calgary (CA)

(72) Inventors: Jeong Woo Kim, Calgary (CA); Brian E. Varcoe, Calgary (CA); John Petrovic, Calgary (CA)

(73) Assignee: Mostar Directional Technologies Inc., Calgary (CA)

( * ) Notice: Subject to any disclaimer, the term of this patent is extended or adjusted under 35 U.S.C. 154(b) by 214 days.

(21) Appl. No.: 14/552,720

(22) Filed: Nov. 25, 2014

(65) Prior Publication Data

US 2015/0143889 A1 May 28, 2015

Related U.S. Application Data

(60) Provisional application No. 61/908,409, filed on Nov. 25, 2013.

(51) Int. Cl.
*G01V 7/00* (2006.01)
*E21B 47/024* (2006.01)

(52) U.S. Cl.
CPC ............... *G01V 7/00* (2013.01); *E21B 47/024* (2013.01)

(58) Field of Classification Search
CPC .................................. E21B 47/024; G01V 7/00
See application file for complete search history.

(56) References Cited

U.S. PATENT DOCUMENTS

| 4,637,480 A | 1/1987 | Obrecht et al. |
| 4,894,923 A | 1/1990 | Cobern et al. |
| 6,480,119 B1 | 11/2002 | McElhinney |

(Continued)

FOREIGN PATENT DOCUMENTS

| CA | 2153693 C | 5/2005 |
| CA | 2505292 A1 | 10/2005 |

(Continued)

OTHER PUBLICATIONS

Journal of Petroleum Technology, Feb. 1999, pp. 30, 34, 36 to 40, 42, 44 to 51.

*Primary Examiner* — John Fitzgerald
(74) *Attorney, Agent, or Firm* — Brett J. Slaney; Blake, Cassels & Graydon LLP

(57) ABSTRACT

A system and method are provided for determining borehole azimuth. The method comprises receiving a first set of data from a first sensor module, the first sensor module comprising a first plurality of accelerometers; receiving a second set of data from a second sensor module, the second sensor module comprising a second plurality of accelerometers, the second sensor module being positioned further downhole than the first sensor module; determining a first set of gravity components using the first set of data and a second set of gravity components using the second set of data; determining a bend angle and a tilt angle using the first and second sets of gravity components; determining a change in azimuth using the bend and tilt angles; and providing an output indicative of the change in azimuth. The system and method may also use a crustal gravity vector to correct the computed azimuth.

26 Claims, 10 Drawing Sheets

(56) References Cited

U.S. PATENT DOCUMENTS

| | | | | |
|---|---|---|---|---|
| 6,508,316 B2* | 1/2003 | Estes | ............... | E21B 47/022 175/45 |
| 6,944,545 B2* | 9/2005 | Close | ............... | E21B 47/022 702/179 |
| 6,975,112 B2 | 12/2005 | Morys et al. | | |
| 7,002,484 B2* | 2/2006 | McElhinney | ......... | E21B 47/022 166/255.2 |
| 7,028,409 B2 | 4/2006 | Engebretson et al. | | |
| 7,080,460 B2 | 7/2006 | Illfelder | | |
| 7,243,719 B2* | 7/2007 | Baron | ............... | E21B 47/022 166/255.2 |
| 7,386,942 B2* | 6/2008 | Seigel | ............... | E21B 47/022 175/45 |
| 7,725,263 B2 | 5/2010 | Sugiura | | |
| 2002/0005298 A1* | 1/2002 | Estes | ............... | E21B 47/022 175/45 |
| 2004/0073369 A1* | 4/2004 | McElhinney | ......... | E21B 47/022 702/6 |
| 2004/0249573 A1* | 12/2004 | McElhinney | ............ | G01V 3/26 702/7 |
| 2005/0268476 A1* | 12/2005 | Illfelder | ............... | E21B 47/022 33/313 |
| 2005/0269082 A1* | 12/2005 | Baron | ............... | E21B 47/022 166/255.2 |
| 2008/0294343 A1* | 11/2008 | Sugiura | ............... | E21B 47/022 702/6 |
| 2010/0300756 A1 | 12/2010 | Bergstrom et al. | | |
| 2011/0015862 A1* | 1/2011 | Sato | ............... | E21B 47/022 702/6 |
| 2014/0102795 A1* | 4/2014 | VanSteenwyk | ... | E21B 47/02216 175/45 |

FOREIGN PATENT DOCUMENTS

| | | |
|---|---|---|
| CA | 2687242 A1 | 12/2008 |
| CA | 2509562 C | 1/2009 |

* cited by examiner

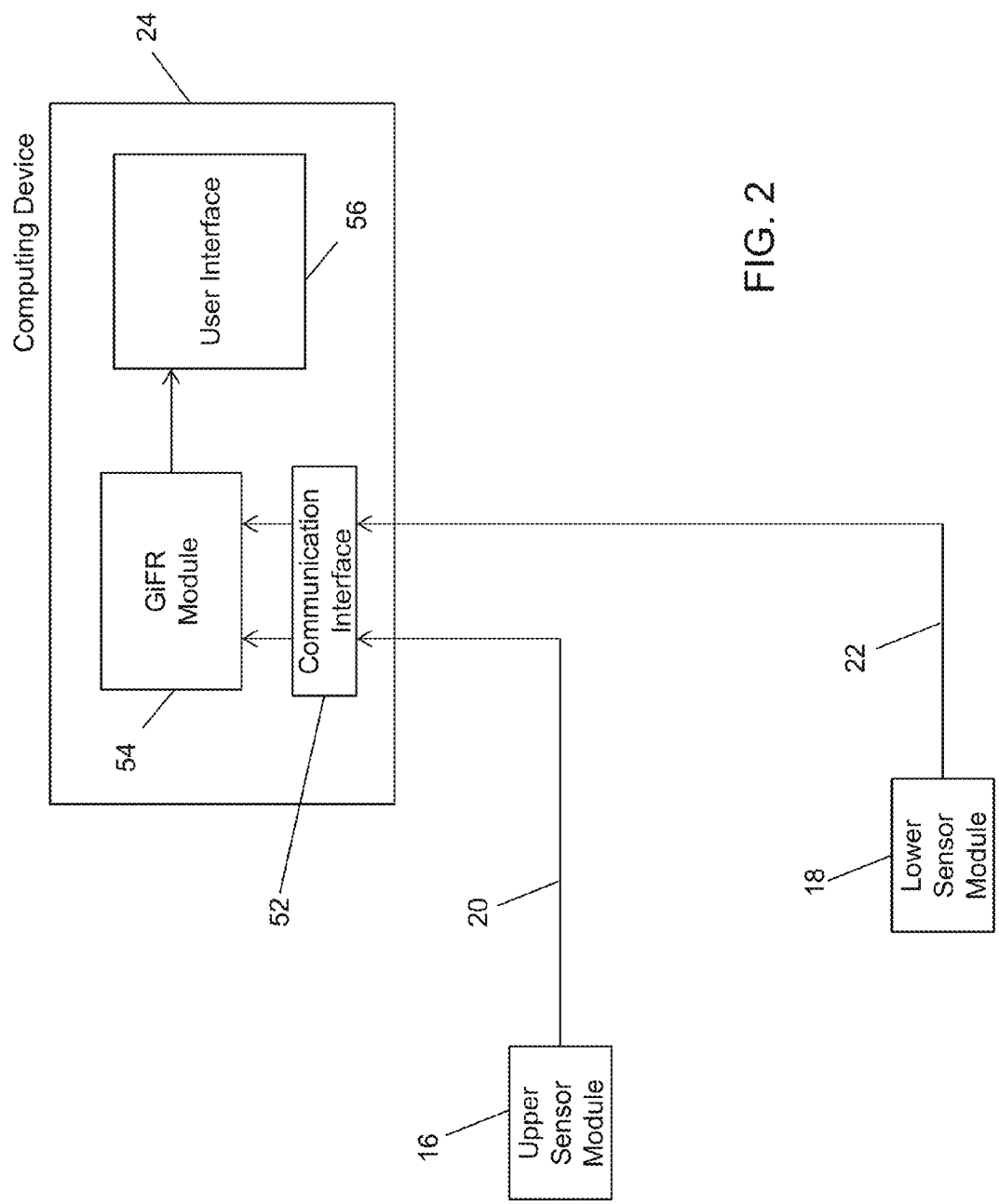

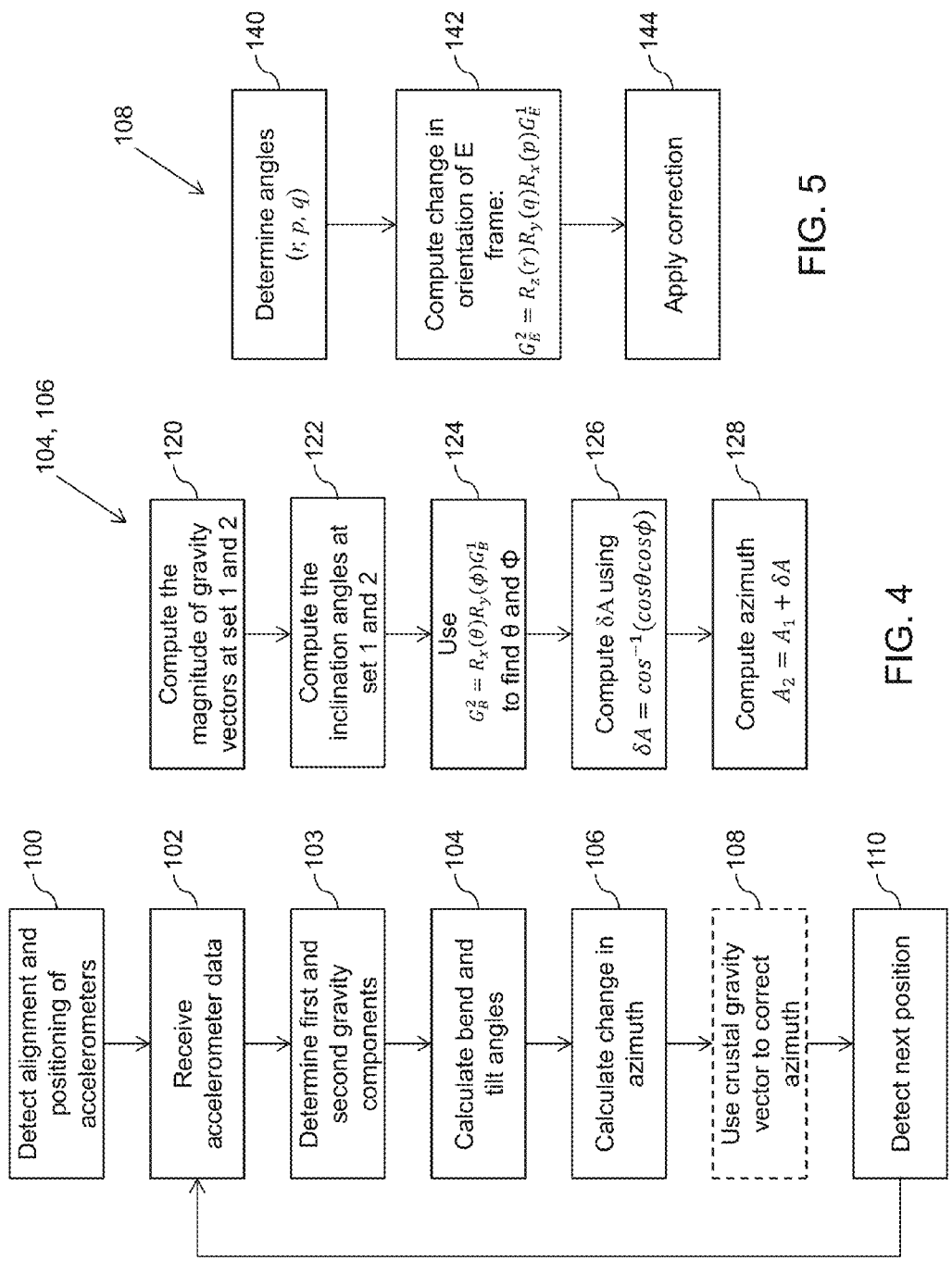

SYSTEM AND METHOD FOR DETERMINING A BOREHOLE AZIMUTH USING GRAVITY IN-FIELD REFERENCING

This application claims priority from U.S. Provisional Patent Application No. 61/908,409 filed on Nov. 25, 2013, the entire contents of which are incorporated herein by reference.

TECHNICAL FIELD

The following relates to systems and methods for determining a borehole azimuth using gravity in-field referencing.

DESCRIPTION OF THE RELATED ART

Directional drilling involves drilling a subterranean borehole along a particular path that, in at least part of its pathway, changes direction to provide at least one bend in the borehole. Subterranean boreholes are often surveyed to determine this particular path using sensor modules comprising magnetometers, gyroscopes, and/or accelerometers. The sensor modules are used to determine the gravity vector and the horizontal plane, as well as the orientation of the borehole longitudinal axis through the inclination and azimuth angles at a survey station. The inclination is the angle between the gravity vector and the projection of the gravity vector on the borehole longitudinal axis. Along with the inclination, azimuth (or bearing) is a value derived from measurements obtained by the sensor modules in order to perform surveying.

Traditionally, borehole surveying includes determining a change in azimuth between two sensor modules spaced from each other along the downhole tool being used. Starting with a known (reference) azimuth, usually at the surface, and adding the determined azimuth change between two sensor modules, the azimuth of the borehole longitudinal axis is computed. There are situations when magnetometers are affected by sources of magnetic interference such as nearby magnetic steel, electromagnetic radiation, ferric minerals in formations or ore bodies, and drilling string interference caused by motors and stabilizers. A primary cause for concern with such magnetic interference is the deflection of the azimuth readings that are obtained using magnetometers.

Gyroscopes and accelerometers have been known to be used as alternatives to using magnetometers to mitigate the effects of magnetic interference. Gyroscopes can be considered to be relatively complex instruments and often need to be frequently re-referenced and protected from high temperatures and vibration. Moreover, it has been found that gyroscopes can have significant variations in azimuth at low angles of inclination. Consequently, accelerometers have also been considered, such as in the techniques described in U.S. Pat. No. 6,480,119 to McElhinney; U.S. Pat. No. 7,028,409 to Engebretson; and U.S. Pat. No. 7,080,460 to Illfelder.

It is an object of the following to address the above-noted disadvantages.

SUMMARY

In one aspect, there is provided a method of determining borehole azimuth, the method comprising: receiving a first set of data from a first sensor module, the first sensor module comprising a first plurality of accelerometers; receiving a second set of data from a second sensor module, the second sensor module comprising a second plurality of accelerometers, the second sensor module being positioned further downhole than the first sensor module; determining a first set of gravity components using the first set of data and a second set of gravity components using the second set of data; determining a bend angle and a tilt angle using the first and second sets of gravity components; determining a change in azimuth using the bend and tilt angles; and providing an output indicative of the change in azimuth.

In another aspect, there are provided computer readable media and a system operable to perform the above method.

BRIEF DESCRIPTION OF THE DRAWINGS

Embodiments will now be described by way of example only with reference to the appended drawings wherein:

FIG. 2 is a block diagram of an example of a system for obtaining data from upper and lower sensor modules;

FIG. 3 is a flow chart illustrating an example set of computer executable instructions that may be executed in determining a gravity-derived borehole azimuth using gravity in-field referencing;

FIG. 4 is a flow chart illustrating an example set of computer executable instructions that may be executed in determining a tilt angle and a change in azimuth;

FIG. 5 is a flow chart illustrating an example set of computer executable instructions that may be executed in performing an azimuth correction based on a crustal gravity vector;

DETAILED DESCRIPTION

Figure 1:
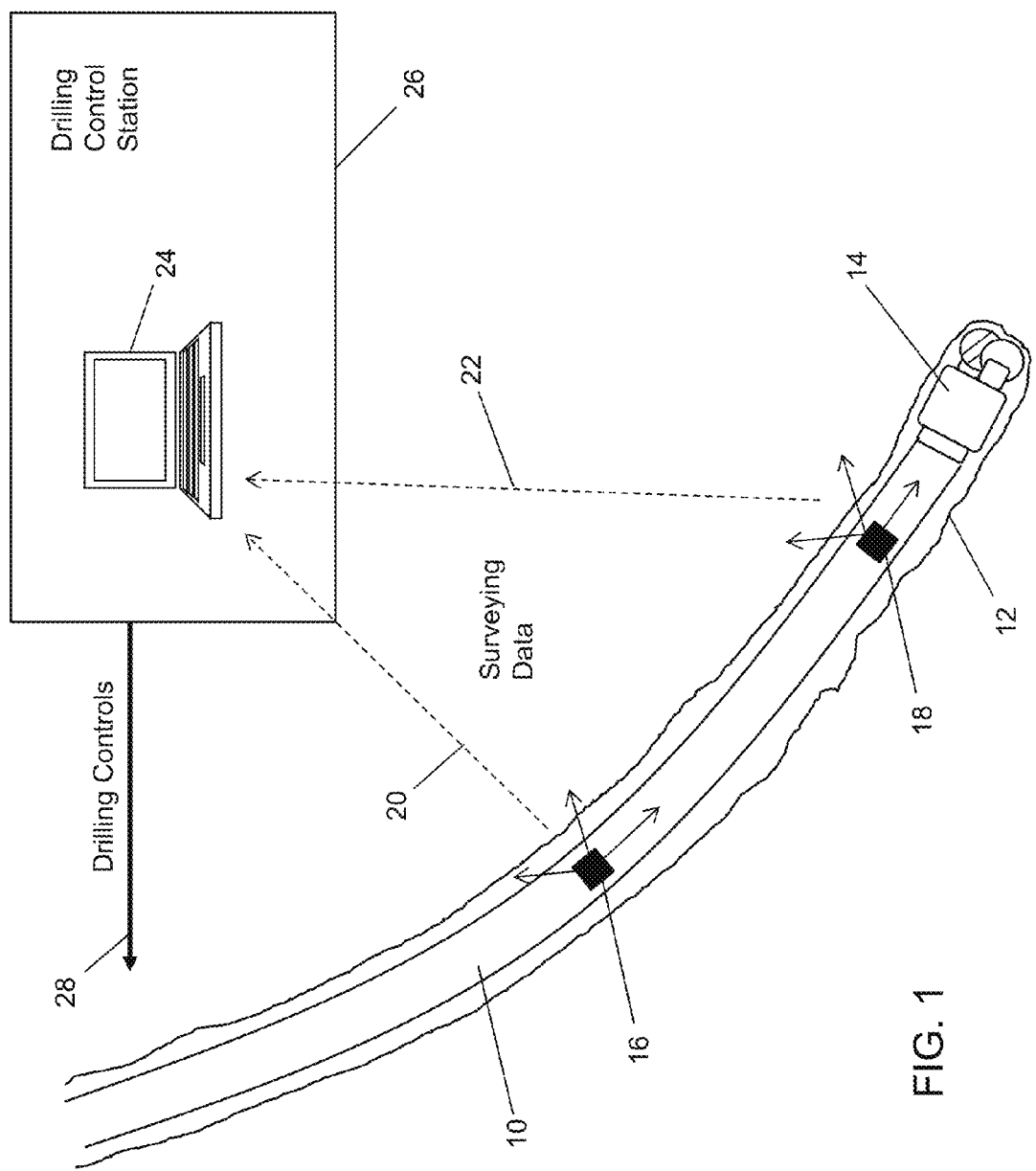
FIG. 1 is a schematic diagram of a directionally drilled subterranean wellbore and drilling equipment having upper and lower sets of sensor modules.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Borehole azimuth that is determined solely from gravity vector components measured by two sets (of typically three) orthogonally spaced accelerometers is referred to as a gravity-derived azimuth. The following provides a method for gravity-derived borehole azimuth determination that uses gravity in-field referencing (GiFR). The GiFR method may be summarized as follows:

1. Compute a borehole azimuth from gravity measurements at two sets of (i.e. upper and lower) orthogonal accelerometers (sensors) coupled together by a semi-rigid joining structure, while inhibiting relative rotation between the sets of accelerometers.

2. For the purpose of computing the borehole azimuth three reference frames defined at the two sets of accelerometers are utilized, namely an Earth-fixed reference frame (E), a Borehole reference frame (B), and a Tool reference frame (T)—see also FIG. 6 described below.

3. The borehole azimuth at the lower set of accelerometers is determined by adding the change in the azimuth between the upper and lower stations due to a bending of the drilling structure that follows the borehole direction.

4. The change in the azimuth is determined by means of two angles that describe the bending of the drilling structure, namely the tilt of the high side angle and the bend angle.

5. The tilt angle of the high side direction (hereinafter the "tilt angle") defines the tilt of the borehole reference frame at the lower set of accelerometers with respect to the borehole reference frame at the upper set of accelerometers—see also FIG. 8 described in detail below. The tilt angle is a result of the bending of the drilling structure in a vertical plane when following the borehole axis. The tilt angle is determined from the magnitude of the gravity vector, the components of the gravity vector in the direction of the long axis of the borehole at the two sets of accelerometers, and the inclination angle at the two sets of accelerometers as described below.

6. The bend angle, shown in FIG. 7, describes the bending of the drilling structure in a horizontal plane when following the borehole axis and is determined from the computed tilt angle, the inclination angle, and magnitude of the gravity vector at the upper set of accelerometers and the components of the gravity vector in the direction of the longitudinal axis of the borehole at the two sets of accelerometers.

7. A change in the azimuth is also determined due to the change of the relative orientation of the axes of the Earth-fixed frame at the upper and lower sets of accelerometers (see also FIG. 9). This change in the axes orientation is found by predetermined knowledge of the crustal gravity vector determined by GiFR and geomagnetic observations.

It has therefore been recognized that a gravity-derived borehole azimuth method that uses gravity in-field referencing (GiFR) utilizes information that is both intrinsic and extraneous to the system gravity information. The intrinsic gravity information is supplied by the accelerometer sensors and is used for computing two angles that describe the deformation of the structure joining the upper and lower sets of accelerometers while drilling. The utilization of these two angles to determine the azimuth change due to the deformation of the joining structure, namely the tilt angle and the bend angle, is a differentiator to other methods. The utilization of the extraneous gravity information from the predetermined knowledge of the crustal gravity vector to correct the azimuth due to the change in the frame axes is also a differentiator.

Turning now to the figures, FIG. 1 illustrates an example of a directional drilling environment 8 in which a drilling structure 10 (e.g. a series of drill rods connected together to form a drill string) is located within a directionally-drilled subterranean borehole 12. In this example, the drilling structure 10 is connected to a drill head 14 at its lower end, and connects to surface drilling equipment (not shown) at its upper end.

An upper sensor module 16 is located upstream along the drilling structure 10 relative to a lower sensor module 18 downstream thereof. Each sensor module 16, 18 in this example includes a plurality of sensors, such as accelerometers. It can be appreciated that although the following examples include sets of three accelerometers, in at least one embodiment, a set of two accelerometers may be sufficient, with access to the crustal gravity vector, as explained below. In the example described below, a set of three accelerometers are included in each sensor module 16, 18. Each sensor module wirelessly transmits acquired surveying data to a surface computing device 24 such as a laptop or other computer, using separate telemetry paths 20 and 22 respectively. In the example shown in FIG. 1, the computing device 24 is located within a drilling control station 26, which includes at least one communication connection 28 with the surface drilling equipment and/or equipment carried in or on the drilling structure 10 to provide drilling controls.

FIG. 2 illustrates schematically a block diagram for an example configuration for the computing device 24. In this example, the computing device 24 includes a communication interface 52 (e.g. a telemetric receiver) for receiving surveying data transmitted from downhole by the upper sensor module 16 via path 20, and by the lower sensor module 18 via path 22. It can be appreciated that the paths 20, 22 may also connect to separate communication interfaces 52. The communication interface 52 receives the transmitted surveying data and provides this data to a GiFR module 54 for computing the gravity-derived borehole azimuth, according to the principles described below. The GiFR module 54 is also communicably connectable to a user interface 56 to enable the azimuth and changes thereto to be displayed for an operator, e.g. to assist in live drilling and directional corrections or changes.

Turning now to FIG. 3, an example set of computer executable instructions is shown, which may be executed in determining a gravity-derived borehole azimuth using gravity in-field referencing. When surveying using upper and lower sensor modules 16, 18 as described above, measurements are made successively as the sensor modules 16, 18 move deeper into the borehole 12. Typically, the upper sensor module 16 is moved to a next position that coincides substantially with the previous position for the lower sensor module 18 while the lower sensor module 18 is positioned further downstream within the borehole 12. At 100, the GiFR module 54 detects an alignment and positioning of the accelerometers and receives the accelerometer data at 102. The GiFR module 54 then uses the received data to determine first and second gravity components from the upper and lower measurements respectively, calculates the bend and tilt angles at 104, and calculates a change in azimuth at 106, details of which are provided below. Optionally, and if available, a crustal gravity vector is used at 108 to correct the azimuth from gravity anomaly fields, e.g. due to ore bodies in a rock formation. The next position is determined at 110 and the process repeated at 102 for the next measurement.

As discussed above, the GiFR process described herein uses the measured components of a gravity vector using two sets of three accelerometers each, which are orthogonally placed and joined by a semi-rigid drilling structure 10. While the drilling structure 10 does not permit a relative rotation between the two sets of accelerometers, the drilling structure 10 can bend, and the parameters associated with this bending used to compute azimuth.

The longitudinal axis of the drilling structure 10 is substantially co-axial with the borehole 12 with no rotation being permitted about the long axis of the drilling structure 10 in the examples described herein. The distance between the upper and lower sensor modules 16, 18 is predetermined and typically fixed once the modules 16, 18 are supported by or within the drilling structure 10. It can be appreciated that the distance between the modules 16, 18 can vary during the surveying, but if so would need to be accurately measured and/or known at different instances.

The GiFR process can be used in Measurement-While-Drilling (MWD) processes, for example in areas and circumstances with high magnetic interference due to a number of sources: nearly magnetic steel, electromagnetic radiation, ferric minerals in formation or ore bodies, drill string interference from motors and stabilizers, etc. The GiFR process can also be used in drilling boreholes with low inclination angles (e.g., less than 5 degrees) as an alternative to gyroscopes that require a certain inclination angle of the borehole 12 to be reached in order to provide reliable directions.

At such small inclinations, it has been found that gyroscopes provide relatively noisy and often unreliable readings. In previous attempts, gravity derived azimuth (GDA) techniques have been used as a substitute technique for determining the azimuth until an inclination is reached at which point gyroscopes can provide reliable directions. On the other hand, at very low inclinations (less than 1 degree), these GDA techniques have been found to have limitations since two of the gravity vector components lay in a plane very close to the horizontal plane.

Consequently, these components are very small, and often no reliable directions can be computed from them. The proposed GiFR technique described herein can be used to provide accurate measurements during the entire range of inclinations, rather than only being suitable in certain circumstance as may be the case with previous methods.

Previous GDA methods can be summarized as follows:

(1) Align the upper set of accelerometers with a reference azimuth (could be at the topography surface). Both sets are rotationally aligned about the longitudinal axis of the borehole.

(2) Position the two sets of accelerometers to perform measurements for a section of the borehole.

(3) Measure the first (upper) set of three orthogonal components of the gravity vector at the survey position.

(4) Measure the second (lower) set of three orthogonal components of the gravity vector.

(5) Calculate the inclination and azimuth of the borehole section from the first and second sets of measured components of the gravity vector.

(6) Repeat measurements for a new section of the borehole. Typically, each section of the borehole is smaller or of substantially the same length as the distance between the two sets of accelerometers along the drilling structure In these previous techniques, the borehole azimuth at the second set of accelerometers is computed by the following steps:

(1) Compute the inclination of the borehole at the position of the upper set 1:

$$Inc1 = a\tan\frac{\sqrt{(Gx1^2 + Gy1^2)}}{Gz1}$$

(2) Compute the inclination of the borehole at the position of the lower set 2:

$$Inc2 = a\tan\frac{\sqrt{(Gx2^2 + Gy2^2)}}{Gz2}$$

(3) Compute an auxiliary value Beta:

$$\text{Beta} = a\tan\left(\frac{(Gx2*Gy1 - Gy2*Gx1)*(Gx1*Gy1*Gz1)}{Gz2*(Gx1^2 + Gy1^2) + Gz1*(Gx2*Gx1 + Gy2*Gy1)}\right)$$

(4) Compute the azimuth at the position of the second set of accelerometers with the reference azimuth A1:

A2=A1+Beta/(1−sin((Inc1+Inc2)/2)).

In another previous technique, the GDA algorithm used was based on mechanizations developed by means of rotations between the reference frames of the two sets of accelerometers as follows:

(1) Modeling the relationship between the sensitive axes of the first set of accelerometers and the Earth-fixed reference frame in terms of an inclination rotational angle from the vertical and an orthogonal high-side rotational angle about the borehole axis.

(2) Modeling the relationship between the sensitive axes of the second set of accelerometers and the sensitive axes of the first set of accelerometers using a first rotational angle, a bend direction angle, a bend magnitude angle and a second rotational angle that is negative of the first rotational angle.

This technique also includes two alternative embodiments that are computationally simpler and may be considered less accurate.

In yet another previous technique, the GDA algorithm for azimuth determination via a direct mathematical solution is based on inclination and tool face angles determined at the first (upper) and second (lower) positions of the sets of accelerometers. The lower set is typically located in the bottomhole assembly (BHA) and close to the drill bit assembly. It may be noted that this technique assumes that the gravity vector components $G_z^1$ and $G_z^2$ are co-planar and, thus, they define a plane called a well plane.

As such, this third previous technique determines the well plane from the measured gravity vector components and then determines the change in the azimuth from this plane. Another point of consideration is the accumulation of the errors with which the azimuth is determined through a survey chain starting with a reference azimuth at the Earth surface. To mitigate the effect of the error accumulation, the use of supplemental reference data supplied from magnetometers or gyro measurements has been recommended for this technique for "in-tie" azimuth referencing. One such error source can be the rotational offset between the two sets of accelerometers, or the misalignment of the X and Y axes of the sensors. The rotational offset can be determined through calibration of the axes prior the survey (as well as downhole), and corrections can be applied to the computed azimuths.

It has been recognized that while the previous techniques may use only two orthogonally positioned accelerometers, in the GiFR process discussed herein, the third gravity vector component can be obtained from the known total gravity field in the survey area and the measured two gravity vector components.

The proposed alternative technique, referred to herein as the GiFR technique, method, process, or algorithm, uses rotations of reference frames. Three reference frames are introduced and the gravity vector components in these frames is describe below, as well as the available transformations between these reference frames. The complete GiFR process summarized in FIG. 3 and discussed above, is also explained in greater detail, and uses two angles that describe the bending of the drilling structure and are used as parameters in the azimuth computations.

Reference Frames

Figure 6:
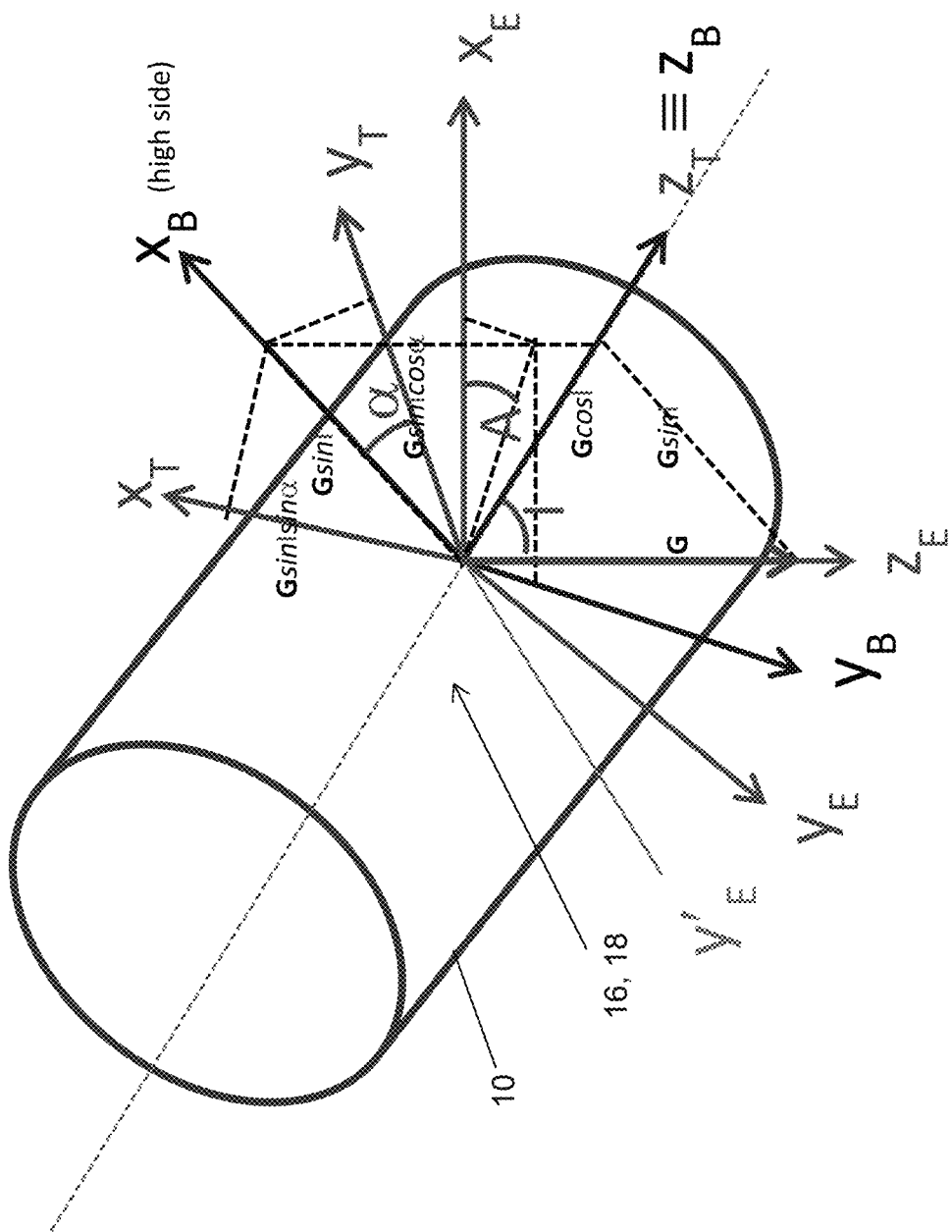
FIG. 6 is a schematic diagram illustrating Earth-fixed, borehole, and tool reference frames.

For the GiFR process, three right-hand reference frames are introduced at a survey station. For example, it may be assumed for this example that a set of accelerometers is positioned at the origin of the reference frames, according to what is shown in FIG. 6. The three right-hand reference frames may be summarized as follows:

(1) The Earth-fixed frame (E) with a X-axis pointing towards the true north, a Z-axis along the local vertical and positive in the direction of the gravity vector G and a Y-axis pointing towards the true east.

(2) The Borehole reference frame (B) with a Z-axis aligned with the long axis of the borehole, a X-axis orthogonal to the Z-axis and pointing towards the high side and a Y-axis laterally aligned across the borehole.

(3) The Tool reference frame (T), in which the orientation of all sensors is resolved, with a Z-axis pointing downhole along the long axis of the survey tool, a Y-axis in the plane perpendicular to the Z-axis and rotated at the gravity tool face angle a with respect to the high side direction and an X-axis orthogonal to the Z and Y axes, all three axes forming together a right-hand frame. The components of the gravity vector $G=(G_x, G_y, G_z)_T^t$ are measured in this frame by the three orthogonally positioned accelerometers.

The three rotational angles are shown in FIG. 6, namely the azimuth A, inclination I and gravity tool face $\alpha$, are positive in counter-clockwise direction as viewed from the Z-axis direction.

Gravity Vector Component Transformations

The components of the gravity vector G can be transformed from one reference frame to another reference frame using a direction-cosine matrix computed by means of the rotation matrices $R_x$, $R_y$ and $R_z$ defined as follows for an angle $\tau$ counted positive in a counter-clockwise direction:

$$R_x(\tau) = \begin{bmatrix} 1 & 0 & 0 \\ 0 & \cos\tau & -\sin\tau \\ 0 & \sin\tau & \cos\tau \end{bmatrix}, \quad (1)$$

$$R_y(\tau) = \begin{bmatrix} \cos\tau & 0 & \sin\tau \\ 0 & 1 & 0 \\ -\sin\tau & 0 & \cos\tau \end{bmatrix},$$

$$R_z(\tau) = \begin{bmatrix} \cos\tau & -\sin\tau & 0 \\ \sin\tau & \cos\tau & 0 \\ 0 & 0 & 1 \end{bmatrix}.$$

A gravity vector given in the E frame can be computed in the B frame by multiplying the vector components with the direction-cosine matrix, as follows:

$$G_B = R_y(I)R_z(A)G_E = \begin{bmatrix} \cos I \cos A & -\cos I \sin A & \sin I \\ \sin A & \cos A & 0 \\ -\sin I \cos A & \sin I \sin A & \cos I \end{bmatrix} G_E, \quad (2)$$

In (2), the gravity vector in E has only one non-zero component, i.e., $G_E=(0, 0, G)^t$. The gravity vector in B is represented by two non-zero components: $(G_z)_B = G \cos I$ in the direction of the borehole longitudinal axis and $(G_x)_B = G \sin I$ in the direction of the X-axis pointing towards high side. Thus $G_B=(G \sin I, 0, G\cos I)^t$.

Gravity vector components can be computed in the T frame using the following transformation:

$$G_T = R_z(-(90°-\alpha))G_B = \begin{bmatrix} \sin\alpha & \cos\alpha & 0 \\ -\cos\alpha & \sin\alpha & 0 \\ 0 & 0 & 1 \end{bmatrix} G_B, \quad (3)$$

In (3), the gravity vector in T is $G_T=(G \sin I \sin \alpha, -G \sin I \cos \alpha, G \cos I)^t$. With $(G_x)_T=G \sin I \sin \alpha$, $(G_y)_T=G \sin I \cos \alpha$ and $(G_z)_T=G \cos I$, the tool face $\alpha$ is computed by:

$$\alpha = \tan^{-1}[(G_x)_T/-(G_y)_T]. \quad (4)$$

The inclination angle is computed by:

$$I = \cos^{-1}[(G_z)_T/G], \quad (5)$$

Or more often by:

$$I = \tan^{-1}[\sqrt{(G_x)_T^2 + (G_y)_T^2}/(G_z)_T]. \quad (6)$$

The transformation of the gravity vector components between the E and T frames is as follows:

$$G_T = R_z(-(90°-\alpha))R_y(I)R_z(A)G_E = \quad (7)$$

$$\begin{bmatrix} \cos I \cos A \sin\alpha + \sin A \cos\alpha & -\cos I \sin A \sin\alpha + \cos A \cos\alpha & \sin I \sin\alpha \\ -\cos I \cos A \cos\alpha + \sin A \sin\alpha & \cos I \sin A \cos\alpha + \cos A \sin\alpha & -\sin I \cos\alpha \\ -\sin I \cos A & \sin I \sin A & \cos I \end{bmatrix} G_E.$$

The GiFR Process

The change in the azimuth at the second set of accelerometers (lower sensor module 18) relative to the first set of accelerometers (upper sensor module 16) can be a result of two independent factors:

(1) a change in the direction of the borehole; and (2) a change in the orientation of the E frame.

It has been recognized that the change in the orientation of E is typically due to a change in direction of the gravity vector in a complex crustal density anomaly field.

The complex density anomaly field is used herein to denote variations in the crustal density from the reference crustal density value of 2.67 g/cm$^3$. For example, such crustal density anomalies can exist in areas with ore deposits, which have density larger than 3.0 g/cm$^3$. The GiFR process can be adapted to include an azimuth correction, e.g., as shown in operation 108 in FIG. 3.

Variations in the direction and magnitude of the gravity vector can also exist in the proximity of one or several existing wells in the drilling site.

The proposed process to derive the change in the azimuth solely from the gravity vector components $G=(G_x, G_y, G_z)_T^t$ measured by two sensor modules 16, 18, each having sets of three orthogonal accelerometers may be given as follows.

In this example, rotation about the longitudinal borehole axis is inhibited and it may be assumed that the drilling structure 10 between the sensor modules 16, 18 is rigid with respect to torsion along this axis and, therefore, there is no relative rotation allowed between the two sets of accelerometers in the sensor modules 16, 18. However, it can be appreciated that, should therebe such a relative rotation, it should be known a priori by measuring accurately the angle of rotation between the two sets of accelerometers.

Figure 7:
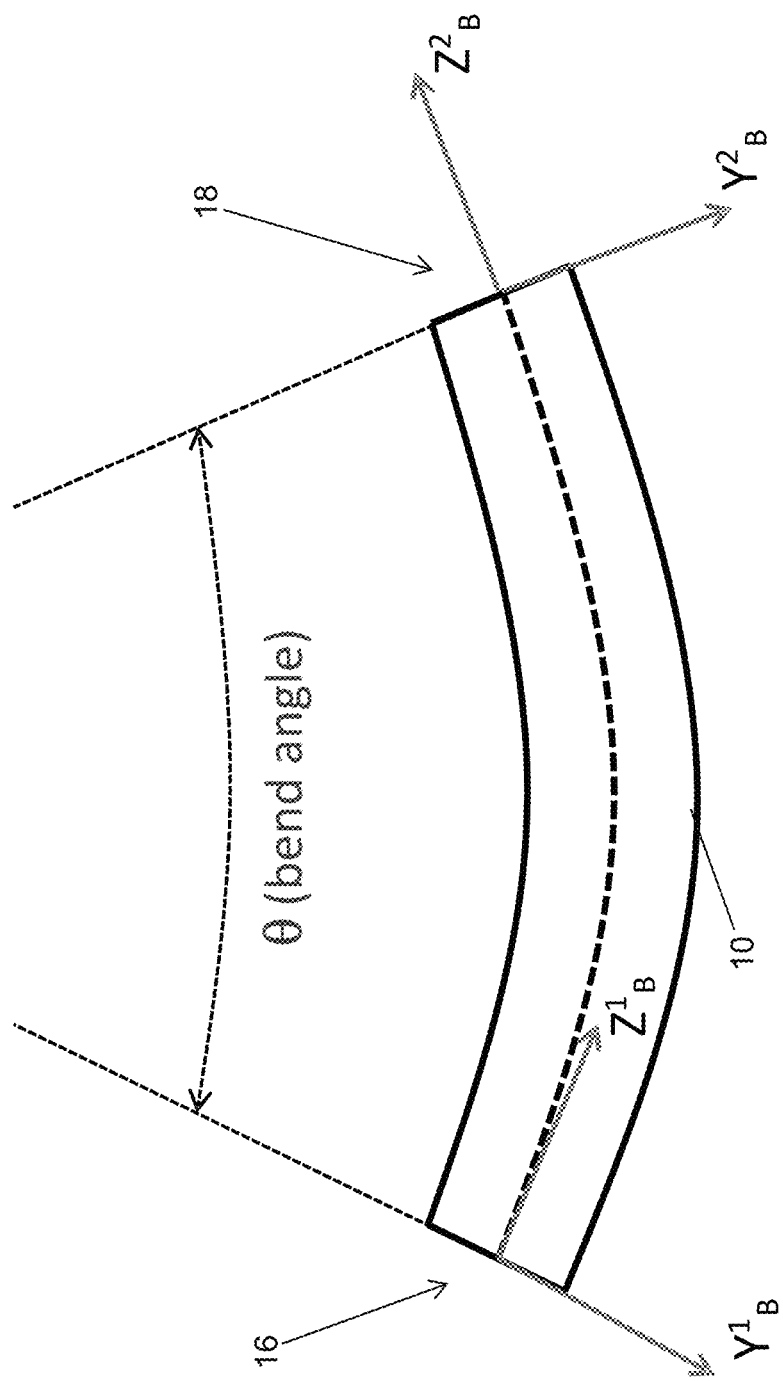
FIG. 7 is a schematic diagram illustrating a bend angle of a drilling structure.

Next, the relationship between the gravity vector components in the B frame at the two sets of accelerometers 1 (upper sensor module 16) and 2 (lower sensor module 18) is considered. Two angles are introduced, namely, the bend angle, θ, which is the angle between the Y-axes at set 1 and set 2, This bend angle is illustrated in FIG. 7 for a horizontal borehole with the X-axes pointing directly upwards.

Figure 8:
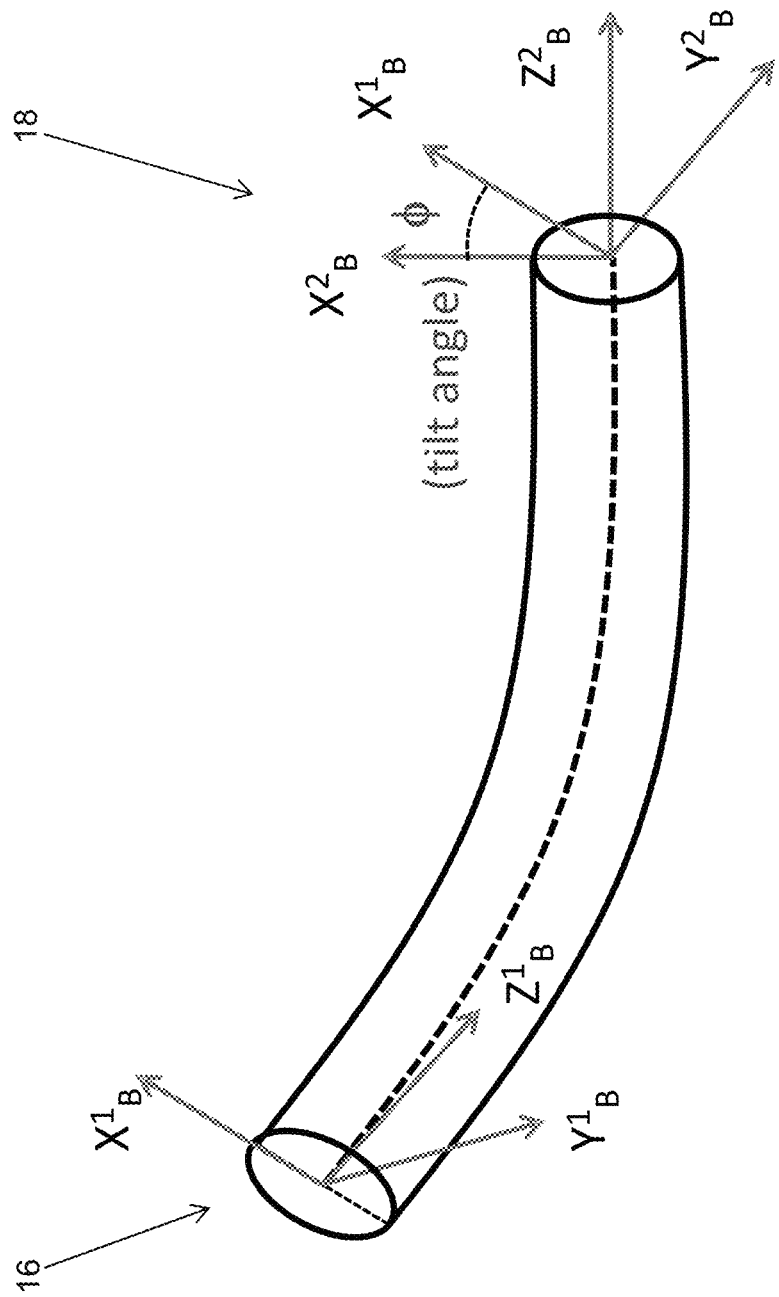
FIG. 8 is a schematic diagram illustrating a tilt angle of the drilling structure.

The second angle introduced in this process, and illustrated in FIG. 8, is the tilt φ of the X-axis pointing towards the high side of the borehole. FIGS. 4 and 5 illustrate operations that may be performed by the GiFR module 54 in computing the bend and tilt angles, and the change in azimuth (also referred to by numerals 104 and 106 in FIG. 3).

With the gravity vectors $G_B^1$ and $G_B^2$ determined and using θ and φ and the rotation matrices $R_x(\ )$, $R_y(\ )$ the following relationship can be established:

$$G_B^2 = R_x(\theta)R_y(\phi)G_B^1. \quad (8)$$

In 8, $G_B^1$ and $G_B^2$ are the gravity vectors in the B frame at sets 1 and 2, respectively determined at 122. Also, $R_y(\phi)$ and $R_x(\theta)$ are given by equations (1) that define a counter-clockwise rotation about the Y and X axes in the B frame at set 1 at angles φ and θ, respectively.

From equation (8), the two unknown angles θ and φ can be found at 124. For the tilt angle of the high side direction, it is found that:

$$\tan(\phi/2) = \frac{G_z^1 \pm \sqrt{(G_z^1)^2 + (G_1 \sin I_1)^2 - (G_2 \sin I_2)^2}}{G_1 \sin I_1 + G_2 \sin I_2} \quad (9)$$

In (9), $G_z^1$ and $G_z^2$ are the measured components of the gravity vector at set 1 and 2 in the direction of the Z-axis in the T frame. the magnitude of the gravity vector at sets 1 and 2 may be computed as: $G_1 = \sqrt{(G_x^1)^2+(G_y^1)^2+(G_z^1)^2}$ and $G_2 = \sqrt{(G_x^2)^2+(G_y^2)^2+(G_z^2)^2}$, respectively. The inclination angles can be computed by equation (5) or equation (6). If the borehole is horizontal, $\tan(\phi/2)=0$ and $\phi=0$.

The bend angle θ is found from the equation:

$$\sin(\theta - 45°) = \frac{G_z^2}{\sqrt{2}\,(G_1 \sin I_1 \sin\phi - G_z^1 \cos\phi)}. \quad (10)$$

Figure 9:
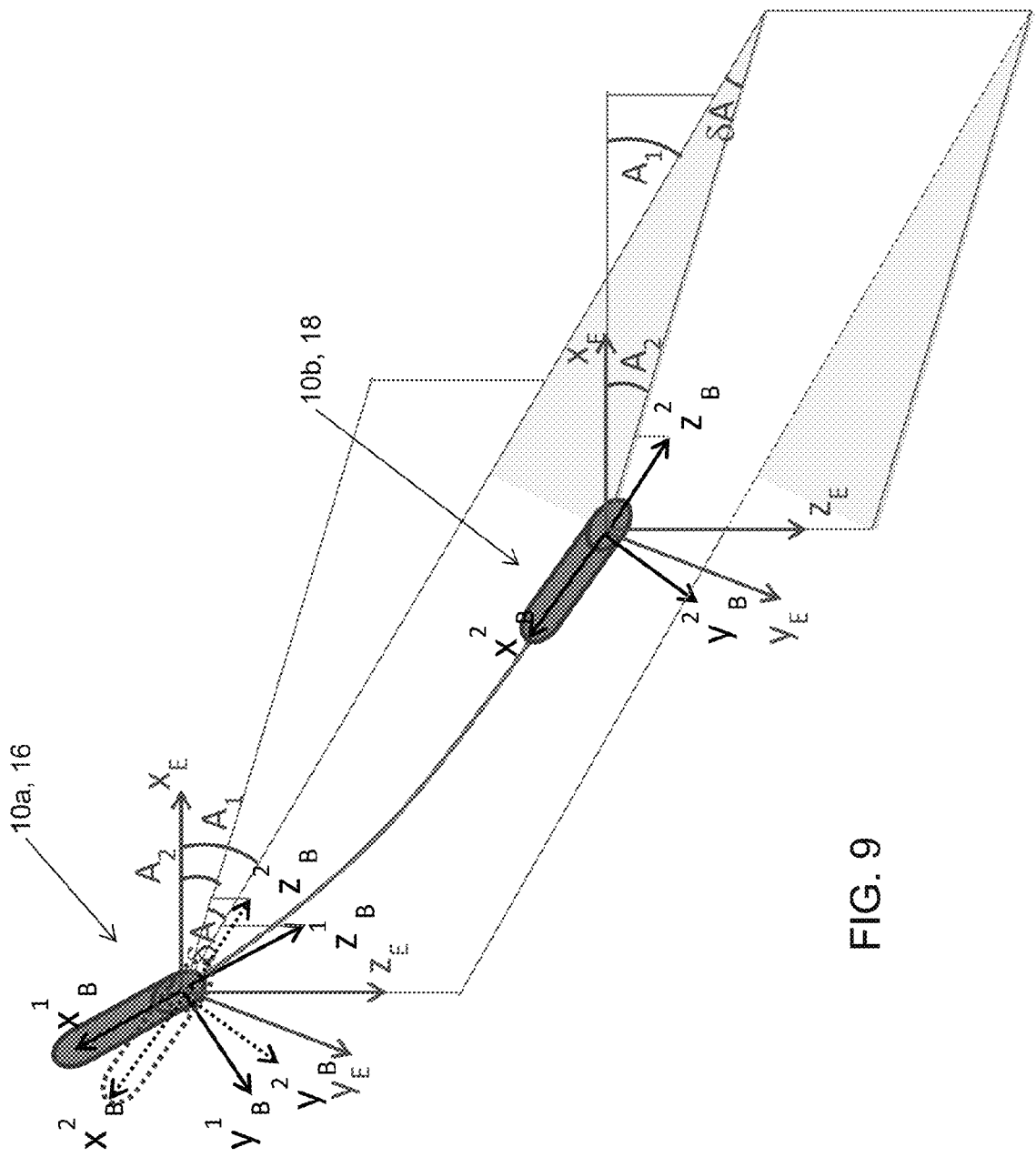
FIG. 9 is a schematic diagram illustrating a graphical representation of relationships between different reference frames associated with upper and lower sensor modules.

FIG. 9 illustrates the upper (1) and lower (2) sets of accelerometers and the E and B frames at 1 and 2. It may be noted that in the figure the local vertical (the direction of the gravity vector) $Z_E$ at position 2 is assumed parallel to the local vertical $Z_E$ at 1. The $X_E$ and $Y_E$ axes are also assumed parallel. Thus, the azimuth change δA is solely explained by the bending of the drilling structure in the borehole. δA can be found from the scalar product of the projections of $G_z^1$ and $G_z^2$ in the horizontal plane $(XY)_E$ and the direction cosine from equation (8). The equation for the azimuth change δA at 126 is as follows:

$$\delta A = \cos^{-1}(\cos\theta \cos\phi). \quad (11)$$

For a horizontal borehole, cos δA=cos φ and δA=θ as the azimuth change δA and the bend angle θ are in the same quadrant. With δA known, the azimuth of $G_z^2$ is computed at 128 as $A_2 = A_1 + \delta A$.

Next, referring to FIG. 5 illustrating operation 108 from FIG. 3, the change in the orientation of the E frame between the upper set 1 and the lower set 2 is taken into account at 142. This change is described by the rotation angles r, p and q of the three axes determined at 140:

$$G_E^2 = R_z(r)R_y(q)R_x(p)G_E^1 = \begin{bmatrix} 1 & -r & q \\ r & 1 & -p \\ -q & p & 1 \end{bmatrix} G_E^1. \quad (12)$$

The crustal gravity based correction may then be applied at 144.

It may be assumed that r, p and q are small (differential) angles of a few arc seconds each and are determined at 140. With $G_E^1 = (0, 0, G_1)^t$ and $G_E^2 = (qG_1, -pG_1, G_1)^t$, it can be seen that the rotation angle of the X-axis is the correction that should be added to δA. The relative orientation of the axes of the E frame (or the angles r, p and q) can be found from detailed maps of the gravity vector components. Such maps can be developed by means of integration of gravimetric and magnetometer data and models.

The GiFR may therefore be summarized as follows:

(1) Align the upper sensor module 16 with a reference azimuth (e.g., at the topography surface). Both sensor modules 16, 18 are rotationally aligned about the longitudinal axis of the borehole.

(2) Position the two sensor modules 16, 18 to perform measurements for a section of the borehole.

(3) Measure the first and second set of gravity vector components of the gravity vector $G=(G_x, G_y, G_z)_T^t$ at the survey position, i.e., $G_x^1, G_y^1$, and $G_z^1$ at the upper set of accelerometers (upper sensor module 16) and $G_x^2, G_y^2$, and $G_z^2$ at the lower set of accelerometers (sensor module 18)—see also FIG. 9. It may be noted that the subscript T is dropped in this summary for ease of illustration.

Calculate the magnitude of the gravity vector at set 1 and 2

$$G_1 = \sqrt{(G_x^1)^2+(G_y^1)^2+(G_z^1)^2} \text{ and } G_2 = \sqrt{(G_x^2)^2+(G_y^2)^2+(G_z^2)^2}.$$

(4) Calculate the inclination angles at set 1 and 2

$$I^1 = \tan^{-1}[\sqrt{(G_x^1)^2+(G_y^1)^2}/G_z^1)] \text{ and } I^2 = \tan^{-1}[\sqrt{(G_x^2)^2+(G_y^2)^2}/(G_z^2)].$$

(5) Calculate the tilt angle φ using equation (9) and the bend angle θ using equation (10).

(6) Calculate the change in the azimuth δA using equation (11) with the known from step 5 angles θ and φ.

(7) Calculate the azimuth at the lower set of accelerometers $A_2 = A_1 + \delta A$, where $A_1$ is the known azimuth at the upper set of accelerometers.

(8) Determine the angle of rotation of the X-axis of the Earth-fixed reference frame at the lower set 2 of accelerometer with respect to the X-axis of the Earth-fixed reference frame at the upper set 1 of accelerometers. Correct the computed azimuth $A_2$ with the angle of rotation of the X-axis (equation 12).

(9) Position the two sets of accelerometers to perform measurements from step 3 for a new section of the borehole Gravity vector components are measured at the new upper and lower stations to determine the azimuth change for the new section of the borehole and the borehole azimuth is computed using the known azimuth at the upper station.

In summary, the GiFR process utilizes the mutual orientation of the axes of the borehole reference frame at the upper and lower sets of accelerometers due to the bending of the drilling structure 10.

Crustal Gravity Field and Anomaly Vector

As discussed above, the crustal gravity field and anomaly vector may be used to apply a correction to the computed azimuth at 108 in FIG. 3.

Figure 10:
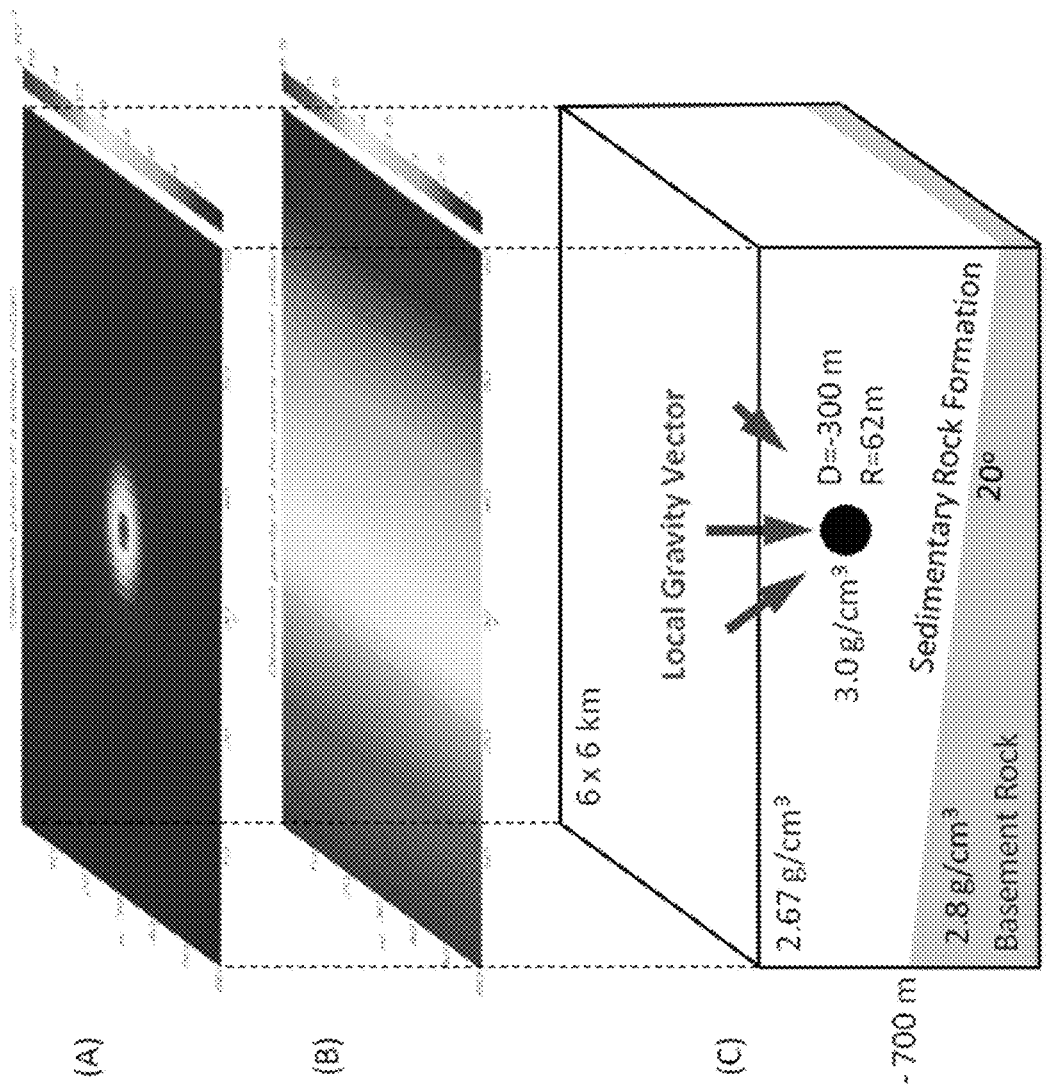
FIG. 10 is a graphical representation of an example of regional gravity anomaly field from rock basement and a local gravity anomaly field from an ore body.
Figure 11:
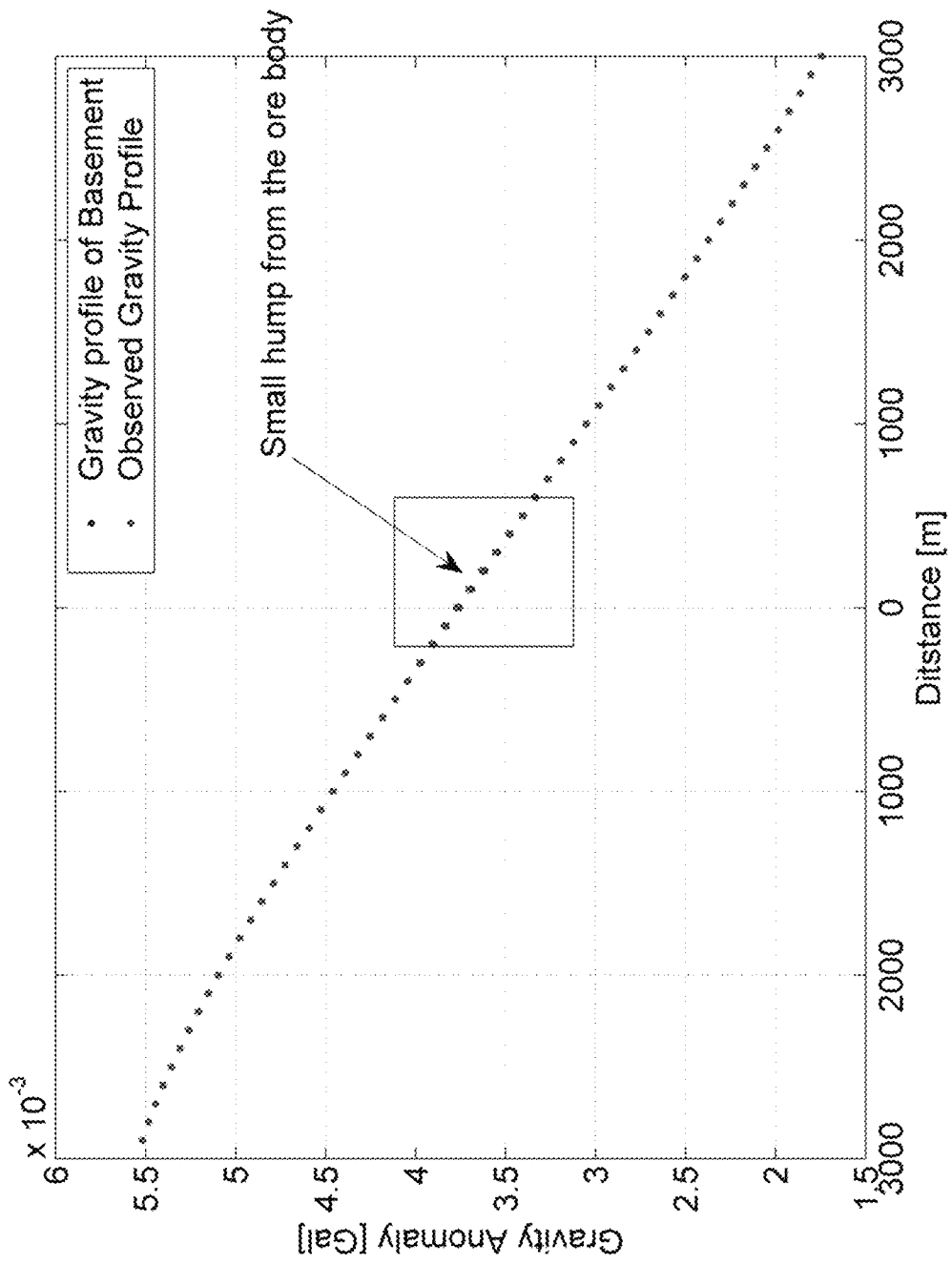
FIG. 11 is a graph illustrating a regional gravity anomaly profile of rock basement and an observed gravity profile of rock basement and ore body.
Figure 12:
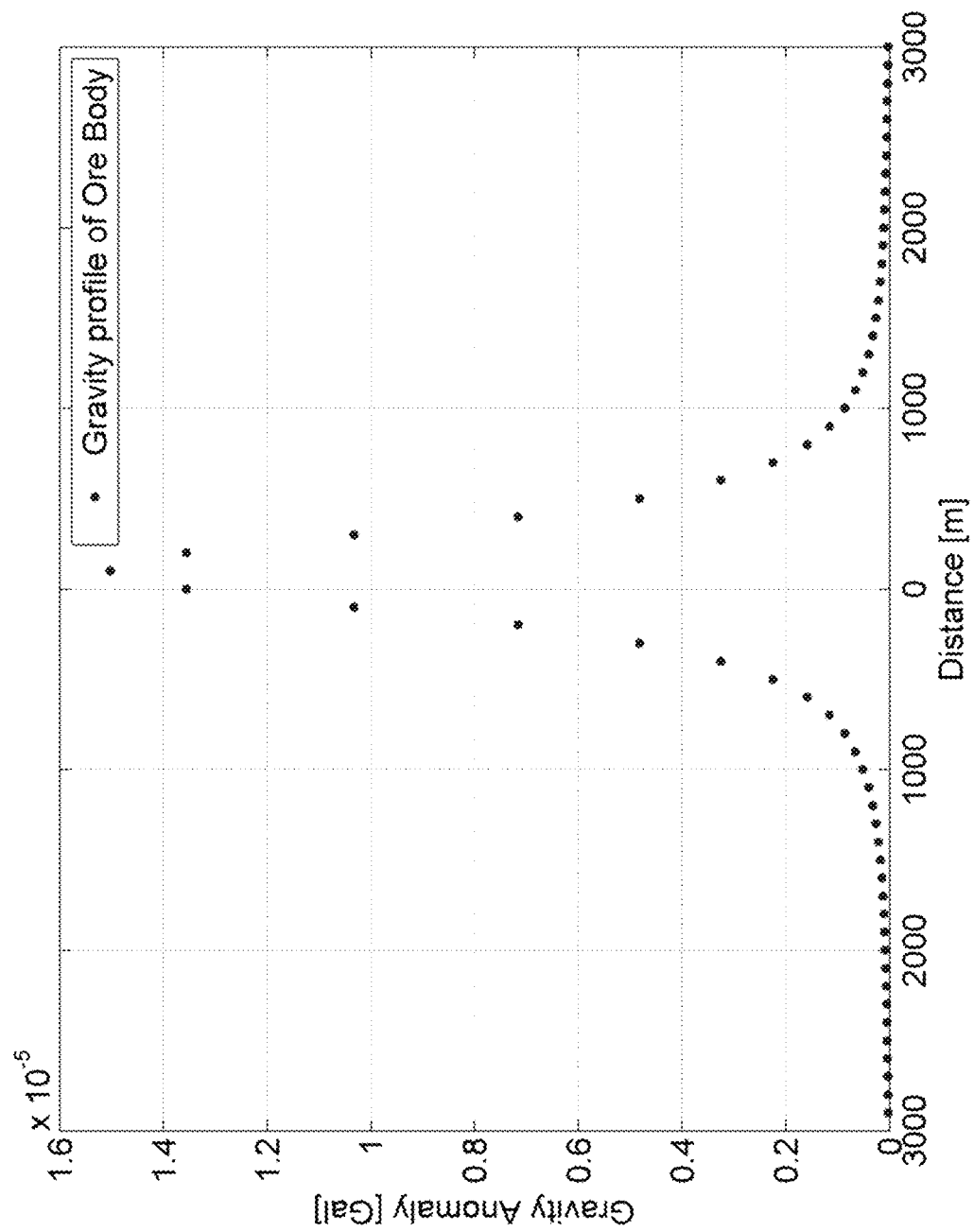
FIG. 12 is a graph illustrating a local gravity anomaly profile of an ore body.

FIGS. 10, 11, and 12 show an example of a geologically complicated gravity anomaly field and the associated gravity anomaly vector. The example includes a spherical shaped ore body (i.e. pyrite or existing wells, etc) buried in a sedimentary rock formation above a basement rock typically granitic (layer (C) in FIG. 10). Layer (A) in FIG. 10 shows the gravity field anomaly produced by the ore body. In this model, the inclined basement layer and its interface with the sediment layer produces a linear regional gravity anomaly field through the crustal density contrast of 0.13 $g/cm^3$, which is the difference between the standard density of rock of 2.67 $g/cm^3$ and the density of the basement of 2.8 $g/cm^3$. This regional anomaly field in layer (B) of FIG. 10 can be observed by means of a gravity measurement profile and is represented by the slope in gravity anomaly that mirrors the slope of 20° of the basement layer shown in layer (C) of FIG. 10.

The ore body generates a local gravity anomaly signal shown in layer (A) of FIG. 10, though the crustal density contrast of 0.33 $g/cm^3$, its depth of 300 m and radius of 62 m. Red arrows denote the gravity anomaly vectors produced by the ore body, which have different direction and length depending on the location; the arrow vector points toward the mass center of the ore body and the length is a function of the distance between the measurement points (i.e., accelerometers) and the ore body.

As shown in FIG. 10, layer (C) provides an example of regional and residual gravity anomaly. The effect of the regional gravity anomaly field in layer (B) should be modelled and removed from the observed gravity profile. Layer (A) is the gravity anomaly from the ore body.

The anomalous gravity anomaly field (by ore body) is superimposed on the regional field (linear components to the inclined basement) and it can be observed in FIG. 11 by the small hump in the graph. FIG. 12 shows the anomaly profile across the ore body after reducing the gravity anomaly by the inclined basement. This example of geological structures can explain the local gravity vector (shown in thick red vectors in layer (C) of FIG. 10.

The crustal gravity vector affects the orientation of the Earth-Fixed Frame, and hence, the precise knowledge of the crustal gravity vector determined by the GiFR process is particularly advantageous.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the sensor modules 16, 18, GiFR module 54, computing device 24, any component of or related to the sensor modules 16, 18, GiFR module 54, computing device 24, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of determining borehole azimuth, the method comprising:
   receiving a first set of data from a first sensor module, the first sensor module comprising a first plurality of accelerometers;
   receiving a second set of data from a second sensor module, the second sensor module comprising a second plurality of accelerometers, the second sensor module being positioned further downhole than the first sensor module;
   determining a first set of gravity components using the first set of data and a second set of gravity components using the second set of data;
   determining a bend angle and a tilt angle using the first and second sets of gravity components;
   determining a change in azimuth using the bend and tilt angles; and
   providing a drilling operation instruction for downhole equipment that is based at least in part on the change in azimuth.

2. The method of claim 1, further comprising detecting a next positioning in the borehole and repeating the method.

3. The method of claim 1, further comprising using the change in azimuth to compute an azimuth at the second sensor module.

4. The method of claim 1, wherein the bend angle and tilt angle are determined by:
   computing a magnitude of a gravity vector at each of the first and second sensor modules;
   computing an inclination angle at each of the first and second sensor modules using the gravity vectors; and
   using the inclination angles and gravity vectors to compute the bend angle and the tilt angle.

5. The method of claim 4, wherein the change in azimuth is computed using the bend angle and the tilt angle according to the following relationship: $\delta A=\cos^{-1}(\cos\theta\cos\phi)$, wherein ($\delta A$ is the change in azimuth, $\theta$ is the bend angle, and $\phi$ is the tilt angle.

6. The method of claim 1, further comprising using a crustal gravity vector to correct the computed azimuth.

7. The method of claim 6, wherein the crustal gravity vector is associated with a gravity anomaly field.

8. The method of claim 6, wherein using the crustal gravity vector to correct the computed azimuth comprises:
   determining a set of rotation angles;
   using the rotation angles to compute a change in orientation of an Earth-fixed frame; and
   applying a correction according to the change in orientation of the Earth-fixed frame.

9. A non-transitory computer readable storage medium comprising computer executable instructions for determining borehole azimuth, the computer executable instructions comprising instructions for:
   receiving a first set of data from a first sensor module, the first sensor module comprising a first plurality of accelerometers;
   receiving a second set of data from a second sensor module, the second sensor module comprising a second plurality of accelerometers, the second sensor module being positioned further downhole than the first sensor module;
   determining a first set of gravity components using the first set of data and a second set of gravity components using the second set of data;
   determining a bend angle and a tilt angle using the first and second sets of gravity components;
   determining a change in azimuth using the bend and tilt angles; and
   providing a drilling operation instruction for downhole equipment that is based at least in part on the change in azimuth.

10. The computer readable storage medium of claim 9, further comprising instructions for detecting a next positioning in the borehole and repeating the method.

11. The computer readable storage medium of claim 9, further comprising instructions for using the change in azimuth to compute an azimuth at the second sensor module.

12. The computer readable storage medium of claim 9, wherein the bend angle and tilt angle are determined by:
   computing a magnitude of a gravity vector at each of the first and second sensor modules;
   computing an inclination angle at each of the first and second sensor modules using the gravity vectors; and
   using the inclination angles and gravity vectors to compute the bend angle and the tilt angle.

13. The computer readable storage medium of claim 12, wherein the change in azimuth is computed using the bend angle and the tilt angle according to the following relationship: $\delta A=\cos^{-1}(\cos\theta\cos\phi)$, wherein $\delta A$ is the change in azimuth, $\theta$ is the bend angle, and $\phi$ is the tilt angle.

14. The computer readable storage medium of claim 9, further comprising instructions for using a crustal gravity vector to correct the computed azimuth.

15. The computer readable storage medium of claim 14, wherein the crustal gravity vector is associated with a gravity anomaly field.

16. The computer readable storage medium of claim 14, wherein using the crustal gravity vector to correct the computed azimuth comprises:
   determining a set of rotation angles;
   using the rotation angles to compute a change in orientation of an Earth-fixed frame; and
   applying a correction according to the change in orientation of the Earth-fixed frame.

17. A system comprising a processor and memory, the memory comprising computer executable instructions for determining borehole azimuth, the computer executable instructions comprising instructions for:
   receiving a first set of data from a first sensor module, the first sensor module comprising a first plurality of accelerometers;
   receiving a second set of data from a second sensor module, the second sensor module comprising a second plurality of accelerometers, the second sensor module being positioned further downhole than the first sensor module;
   determining a first set of gravity components using the first set of data and a second set of gravity components using the second set of data;
   determining a bend angle and a tilt angle using the first and second sets of gravity components;
   determining a change in azimuth using the bend and tilt angles; and
   providing a drilling operation instruction for downhole equipment that is based at least in part on the change in azimuth.

18. The system of claim 17, further comprising instructions for detecting a next positioning in the borehole and repeating the method.

19. The system of claim 17, further comprising instructions for using the change in azimuth to compute an azimuth at the second sensor module.

20. The system of claim 17, wherein the bend angle and tilt angle are determined by:
   computing a magnitude of a gravity vector at each of the first and second sensor modules;
   computing an inclination angle at each of the first and second sensor modules using the gravity vectors; and
   using the inclination angles and gravity vectors to compute the bend angle and the tilt angle.

21. The system of claim 20, wherein the change in azimuth is computed using the bend angle and the tilt angle according to the following relationship: $\delta A=\cos^{-1}(\cos\theta\cos\phi)$, wherein $\delta A$ is the change in azimuth, $\theta$ is the bend angle, and $\phi$ is the tilt angle.

22. The system of claim 17, further comprising the first sensor module and the second sensor module and a communication connection between each of the first sensor module and second module and the processor.

23. The system of claim 22, wherein the processor is incorporated into a computing device utilized at a surface site for controlling the drilling operation.

24. The system of claim 17, further comprising instructions for using a crustal gravity vector to correct the computed azimuth.

25. The system of claim 24, wherein the crustal gravity vector is associated with a gravity anomaly field.

26. The system of claim 24, wherein using the crustal gravity vector to correct the computed azimuth comprises:
   determining a set of rotation angles;
   using the rotation angles to compute a change in orientation of an Earth-fixed frame; and
   applying a correction according to the change in orientation of the Earth-fixed frame.

* * * * *